May 27, 1958
EUGENE BERMAN
NOW BY CHANGE OF NAME
EUGENE BEERMAN ET AL
LET-DOWN TYPE VEHICLE CLOSURE
Filed June 16, 1955
2,836,457
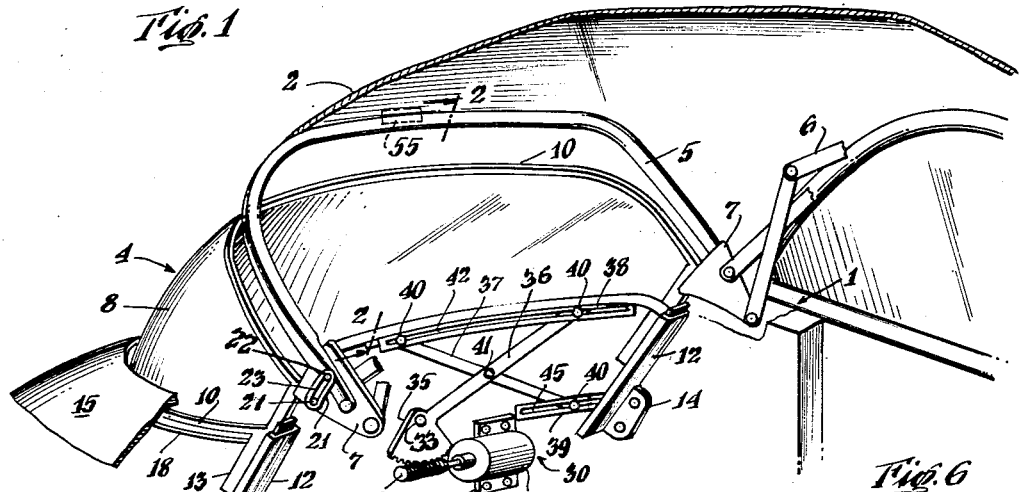
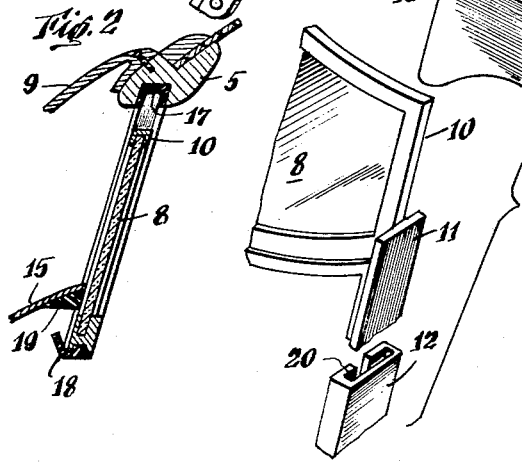
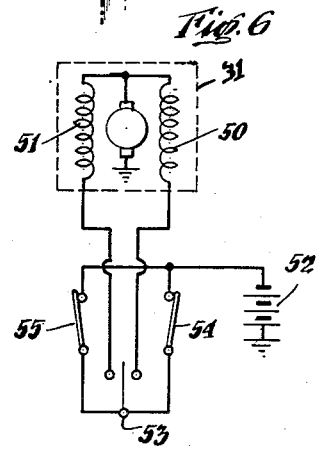
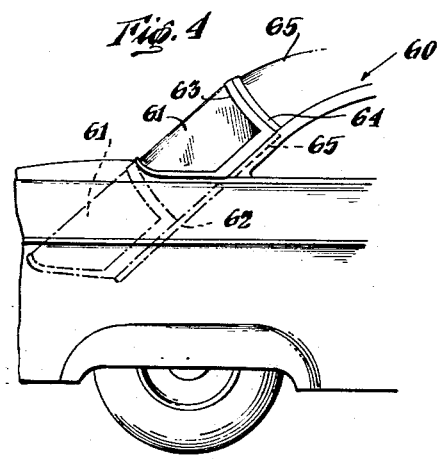
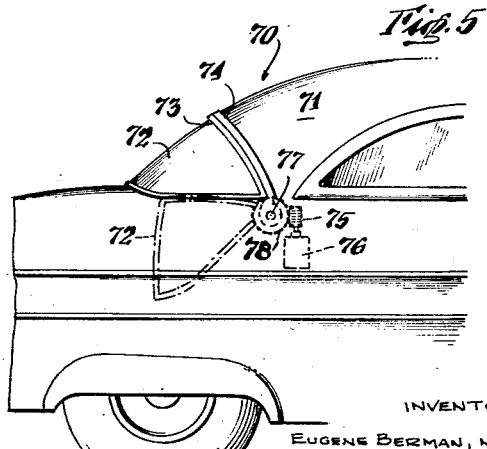
INVENTORS
EUGENE BERMAN, NOW
BY CHANGE OF NAME,
EUGENE BEERMAN &
AARON EISENBERG
BY
ATTORNEY United States Patent Office 2,836,457
Patented May 27, 1958

2,836,457

LET-DOWN TYPE VEHICLE CLOSURE

Eugene Berman, Belle Harbor, and Aaron Eisenberg, Brooklyn, N. Y.; said Eugene Berman, now by change of name Eugene Beerman Application June 16, 1955, Serial No. 515,954

7 Claims. (Cl. 296—44)

The present invention relates to vehicle windows and more particularly to a let-down rear window assembly for passenger type automobiles.

The use of let-down or opening rear windows in automobiles is at present almost exclusively confined to the lowerable or openable rear portion of convertible tops. Convertible tops have various arrangements of glass or plastic windows which either fold down with the rest of the convertible top or which are unclipped or zippered open and folded out of the way before the remainder of the top is lowered. The present types that fold down with the rest of the top are small in area so that they will not be folded or torn, if plastic, or shattered, if glass, as the flexible top is folded into its storage compartment. Such small types of rear view windows are undesirable from a functional point of view, as they provide only a small viewing area and as they are difficult to look through. The types which are opened independently of the top are unclipped or zippered out and if made with a satisfactorily large area, are necessarily made of a relatively light, flexible plastic, as they must be easily handled and must be folded out of the way. These larger types are difficult to operate and, as they are not suitable for folding down with the rest of the top, they must be handled separately when the top is lowered. They are also frequently damaged during the folding of the top.

The rear portion of the conventional convertible top adjacent the rear window and behind the last of the top supporting bows is worn out rapidly during the lowering of the top as it must be folded and creased sharply to fold clear of the remainder of the top and into a suitable storage space or boot. The present invention replaces this portion with a sturdy and independently lowerable portion.

Accordingly, an object of the present invention is to provide an improved rear window assembly for a vehicle.

Another object of the present invention is to provide a rear window portion for convertibles, as well as other model automobiles, which is large enough to provide unrestricted rear vision and which may be independently lowered.

Another object of the present invention is to provide a let-down rear window for a vehicle.

Another object of the present invention is to provide a sturdy let-down type rear top portion for a convertible automobile which is operated independently of the remainder of the top.

Another object of the present invention is to provide a let-down rear window for a vehicle suitable for remote control from the driver's seat or other locations.

Another object of the present invention is to provide a let-down mechanism for a vehicle rear window.

Another object of the present invention is to provide a let-down rear window which may be partially or fully opened, as desired, independently of other window or top portions.

Another object of the present invention is to provide an attractive, easily installed, and efficient let-down rear window for a vehicle.

Another object of the present invention is to provide a let-down rear window which is suitable for installation in presently used automobile models.

Another object of the invention is to provide a let-down enclosure for the rear portion of a convertible automobile which entirely eliminates the area of greatest fabric wear and leakage in the convertible top to substantially increase top life.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view of the let-down window installed in a convertible automobile;

Fig. 2 is a sectional view of the let-down window taken along the line 2—2 of Fig. 1;

Fig. 3 is an exploded perspective of the corner track portion of the let-down window assembly;

Fig. 4 is a fragmentary side elevational view of a hard top vehicle with a let-down rear window in accordance with the present invention;

Fig. 5 is a fragmentary side elevational view of a hard top vehicle with another embodiment of the let-down window of the present invention; and Fig. 6 is a schematic diagram of the let-down window regulator control system.

Referring to the drawing, Fig. 1 shows a let-down rear window assembly 4 installed in an otherwise conventional convertible automobile 1. The conventional flexible canvas top 2 extends forwardly of the rear top bow 5 and it is supported by a conventional top support and folding linkage which is partially indicated at 6. The rear window assembly replaces the conventional canvas and window portion which normally is fitted between the rear top bow 5 and the rear deck 15.

In its preferred form, the let-down rear window comprises a curved or wrap-around window 8 shaped to occupy the entire space between the rear deck 15 and the rear top bow 5 in its raised position. Other shapes of windows may be used, depending on the car top design and the relative spacing of the car rear deck 15 and the rear top bow 5.

The rear top bow 5 is pivotally attached to a conventional pivot bracket 7 which is modified, as will be more fully described below, to accommodate the window 8. The pivot bracket 7 is turned by the conventional top lowering mechanism during the lowering of the convertible top to swing rear top bow 5 and the top support linkage 6 downwardly into a storage boot. Pivot bracket 7 is modified to accommodate the let-down window of the present invention by the addition of a stop to fix the raised position of rear top bow 5 and by the addition of a slot 16 to accommodate the edge portion of window 8. The stop comprises a slotted link 21 cooperating with a pin 24 on pivot bracket 7 and pin 22 on rear top bow 5 movable in slot 23 of link 21 to limit the raised position of rear top bow 5 to a predetermined position. The rear window 8 is preferably mounted in a metal frame or edging 10. At either side of the window a slide 11 (Fig. 3) is rigidly attached to the frame 10 to slidably mount the window in tracks 12. Tracks 12 are fixedly attached to the car body by brackets 14 so that the window 8 may be slid on tracks 12 from a closed position adjacent rear bow 5 to an open position with the top of the window 8 below the automobile rear deck 15. Space is left above the window 8 in its open position to accommodate the convertible top in its lowered position. The frame 10 is suitably reinforced adjacent slide 11, such as by backing member 13.

A preferred form of window control mechanism or regulator to raise and lower the window 8 is shown in Fig. 1. Other types of power or manually operated regulators may be used. Regulator 30 comprises a drive motor 31 coupled to toggle arms 36 and 37 by a worm 34 and a worm gear 35 on toggle arm 36. Toggle arm 36 is pivoted on a fixed pivot 33 and is pivotally connected to toggle arm 37 by pin 41. The lower end of toggle arm 37 is slidably anchored in slot 45 in fixed track 39 to anchor the lower end of toggle arm 37. The upper ends of both toggle arms 36 and 37 are slidably connected to upper bar 38 by pins 40 in slot 42 so that bar 38 is raised in a horizontal position as the toggle arms are turned toward a vertical position and is lowered as the toggle arms are swung toward a horizontal position.

In certain cases it is more convenient to use two smaller regulator mechanisms and to locate one at each side of the window.

A preferred form of electrical remote control circuit for the regulator is shown in Fig. 6. Motor 31 comprises a reversible electric motor having a field winding 50 which is energized to turn it in one direction and a field winding 51 oppositely wound to turn it in the opposite direction. These windings are connected to the vehicle battery through a double throw switch 53 so that one or the other of the coils can be energized to turn the motor in the desired direction to either raise or to lower the window 8. The switch is located at a point convenient to the vehicle driver to allow him to control the rear window position. Additional switches may be placed in parallel with switch 53 at other convenient positions in the vehicle for the use of other passengers. In order to cut off the motor 31 when the window has reached either its upper or its lower position, suitable contact switches 54 and 55 are placed in the lines to the motor coils. Thus switch 54 is positioned in a suitable place on rear top bow 5 to be opened by the window 8 to shut off the motor 31 when the window is fully closed, and switch 55 is suitably located within the vehicle to be opened by the window when it reaches its fully opened position.

In order to provide an airtight and a watertight seal for the window in its closed position, grooves are provided to receive the top and side portions of the window frame 10. Thus, the under side of rear top bow 5 has a groove 17 to receive the top of frame 10 and pivot bracket 7 has groove 16 to receive the sides of frame 10. The grooves 16 and 17 are preferably lined with a suitable resilient lining to further seal the window against the weather in its closed position. As a further protection against the weather, a rear visor 9 (Fig. 2) may be run across the top of rear top bow 5. The bottom of window 8 is sealed against the weather in its closed position by resilient gasket 18 fitted into the bottom of the window frame and adapted to be turned against a resilient seating strip 19 located on the edge of the automobile rear deck 15. The window 8 is located in its downward or open position so that it clears the folded convertible top. The window 8 thus may be raised or lowered whether the top 2 is up or down. Thus, for example window 8 may be raised together with the other windows to provide a glass wall entirely around the vehicle sides with the top open.

Although the let-down rear window is particularly adapted for a convertible automobile it also is adapted for use on the regular closed types or hard top types of automobiles. Fig. 4 shows a let-down rear window generally similar to the one of Fig. 1 installed on a hard top vehicle. In the application the rear top bow 5 of the convertible top is replaced by a grooved upper strip 64 around the car top which is adapted to receive the top 63 of the movable window frame in its up position. A suitable set tracks 62 is mounted within the rear portion of the automobile.

Another embodiment 70 of the let-down rear window is shown in Fig. 5 in which the framed rear window 72 is swung from its closed position with top edge 73 thereof abutting strip 74 of car top 71 to its opened position on guide means in the form of pivot members 77 located at either side of the window. A preferred control for such a window is shown and it consists of an electric control motor 76 rotating the window through the intermediation of a worm 75 engaging a worm gear 78 on the pivot.

It can be seen that an improved rear enclosure or window has been disclosed which is controlled independently of the vehicle roof and which is adaptable for remote control so that rear ventilation can be provided in a vehicle by the driver at will without his having to leave the driver's seat. A rear window has been disclosed which is particularly suited for convertible type vehicles as it provides a rear window which can be lowered and which it at the same time sturdy and of large area. The window allows the rear portion of the convertible to be partially or completely opened while the top portion is left up to provide protection against the sun or dampness. The window is also easily manufactured and can be made by routine manufacturing processes and installed in the vehicle with regular production line techniques. The presently used convertible tops with their flexible canvas rear portions require custom tailoring treatment due to the flexible nature of the covering material and its tendency to stretch, shrink and crease during and after installation. Thus the conventional tops present serious installation and leakage problems in their rear portion for which the window of the present invention provides an improved enclosure.

The present invention also provides a rear window having a large area and which is adapted for improved styling of the rear portion of the vehicle. By being selectively operated for any degree of opening between full closed and full opened the window provides a degree of draft control not available in the present convertibles which are either fully open or fully closed at their rear portions. The rear window assembly of the present invention is also adapted for easy cleaning and in its preferred form of glass or hard plastic it is resistant to scratching to a degree not now found in present large size convertible rear windows where softer and flexible plastics are used to allow the window to be lowered with the remainder of the top.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A let-down rear window assembly for a convertible-type automobile having a pivotally mounted rear top bow supporting the rear end of a flexible top covering when in its raised position and having the rear edge of the covering terminating at said bow, comprising stop means for fixing the raised position of said bow, a transparent pane adapted to fill the area between the rear top bow and the automobile rear deck, a movable frame for supporting said window and adapted to fit said transparent pane to the space substantially defined by the rear top bow and extending to the opposite ends thereof and the edge of the vehicle rear deck therebelow, rigid guide means on the automobile independent of said bow and the covering attached thereto connected to said frame to direct its movement, and a regulator operatively connected to said frame to move said pane and frame from a closed position adjacent said rear top bow to an open position in the vehicle body.

2. In a vehicle body having a rear deck and a convertible top of the type including a rear bow member and brackets pivotally mounted on said body for pivotally mounting the ends of said bow member, stop means for fixing the raised position of said bow and defining a space between said bow and said rear deck extending to the opposite ends of said bow, a rigid transparent closure member arranged for movement on said body to close said space, rigid, interengageable means on said body and closure member for guiding the movement of said closure member, said bow member being formed with a groove on the underside thereof for receiving the top edge of said closure member, and means for moving said closure member between closed and open positions thereof.

3. In a vehicle body, a convertible flexible top including a rear bow member, brackets pivotally mounted on said body for pivotally mounting the opposite ends of said bow member, stop means on said brackets for fixing the raised position of said bow member, a rigid transparent closure member slidably mounted on said body for movement towards and away from said bow member, track means fixed to opposite sides of said body adjacent said brackets, slide means on opposite edges of said closure member movable in said track means, said bow member being formed with a groove on the underside thereof for receiving the top edge of said closure member, a resilient gasket on the bottom edge of said closure member and including a projecting portion, and a resilient seating strip on said body engageable by the projecting portion of said closure gasket in the closed position of said closure member.

4. In a vehicle body as in claim 3 wherein said brackets are formed with slots in an edge thereof to receive edge portions of said closure member in the closed position thereof.

5. In a vehicle body as in claim 3 wherein said stop means comprises a pin on said bracket and a pin on said bow member and a slotted link engaging said pins.

6. In a vehicle body including a rear deck and a convertible flexible type top including a rear bow member and brackets pivotally mounted on said body for pivotally mounting the ends of said bow member, a transparent closure member and a rigid frame for the edges of said closure member, said frame having downwardly projecting reinforcing members on the opposite ends thereof, slide members fixed to the lower ends of said frame at the opposite ends thereof and on said reinforcing members, track members fixed to said body for receiving said slide members, said brackets being formed with slots on an edge thereof to receive the end portions of said closure member above the upper ends of said slide members, means for fixing the raised position of said bow member, means on said bow member for sealing the top edge of said closure member in the closed position thereof, and means for moving said closure member between closed and retracted positions thereof.

7. In a vehicle body including a rear deck and a convertible flexible type top including a rear bow member and a flexible covering having the rear edge thereof terminating at and affixed to said rear bow member, bracket means on said body for pivotally mounting the opposite ends of said bow member, said bow member in the raised position thereof and the edge of said rear deck defining a space therebetween extending to the opposite ends of said bow member, a movable transparent closure member for said space and a frame for the edges of said closure member, means for guiding said closure members between positions closing and opening said space comprising rigid guide members on the opposite ends of said frame, guide means on said body interengageable with said guide members, means for fixing the raised position of said bow member and to limit the vertical extent of said space, and means for moving said closure member between said opening and closing positions thereof.

References Cited in the file of this patent
UNITED STATES PATENTS

| | | |
|---|---|---|
| D. 175,324 | Sullivan | Aug. 9, 1955 |
| 1,759,250 | Wright | May 20, 1930 |
| 1,935,468 | Dittus | Nov. 14, 1933 |
| 1,952,252 | Heuser | Mar. 27, 1937 |
| 2,318,143 | Cutting | May 4, 1943 |
| 2,621,037 | Riedell | Dec. 9, 1952 |
| 2,623,779 | Catell | Dec. 30, 1952 |
| 2,714,035 | Limberg | July 26, 1955 |
| 2,747,923 | McLean | May 29, 1956 |

FOREIGN PATENTS

| | | |
|---|---|---|
| 1,049,026 | France | Aug. 12, 1953 |
| 853,714 | Germany | Oct. 27, 1952 |
| 436,065 | Italy | June 10, 1948 |